H. W. LEONARD.
ELECTRIC RAILWAY SYSTEM.
APPLICATION FILED APR. 1, 1905.
1,029,698.
Patented June 18, 1912.
7 SHEETS—SHEET 4.
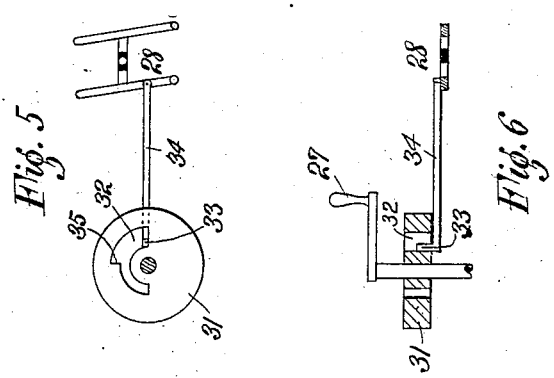
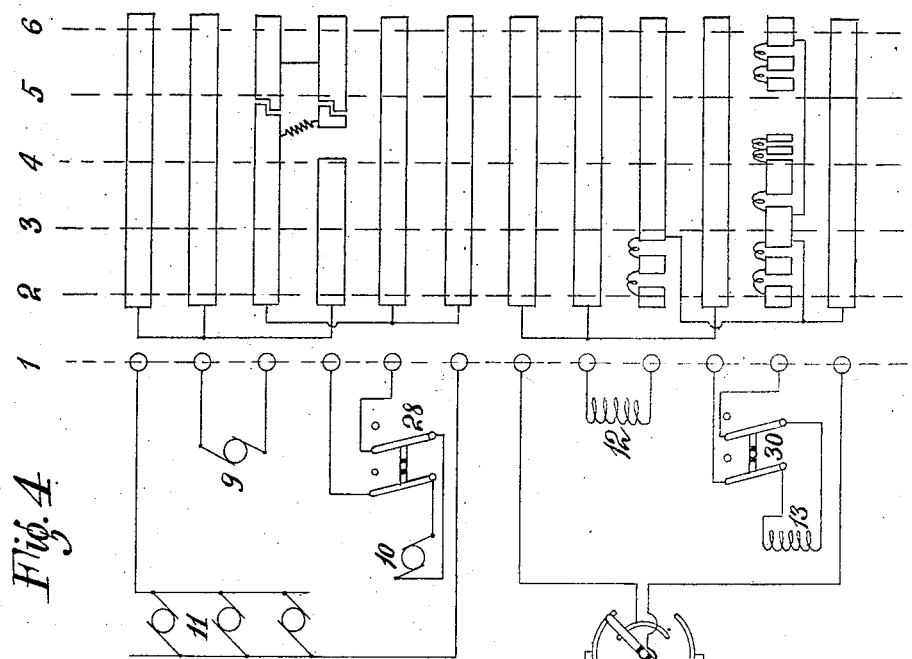
Witnesses
L. K. Singer.
Geo. A. Hoffman.
Inventor
H. Ward Leonard
By his Attorney
C. V. Edwards H. W. LEONARD.
ELECTRIC RAILWAY SYSTEM.
APPLICATION FILED APR. 1, 1905.
1,029,698.
Patented June 18, 1912.
7 SHEETS—SHEET 5.
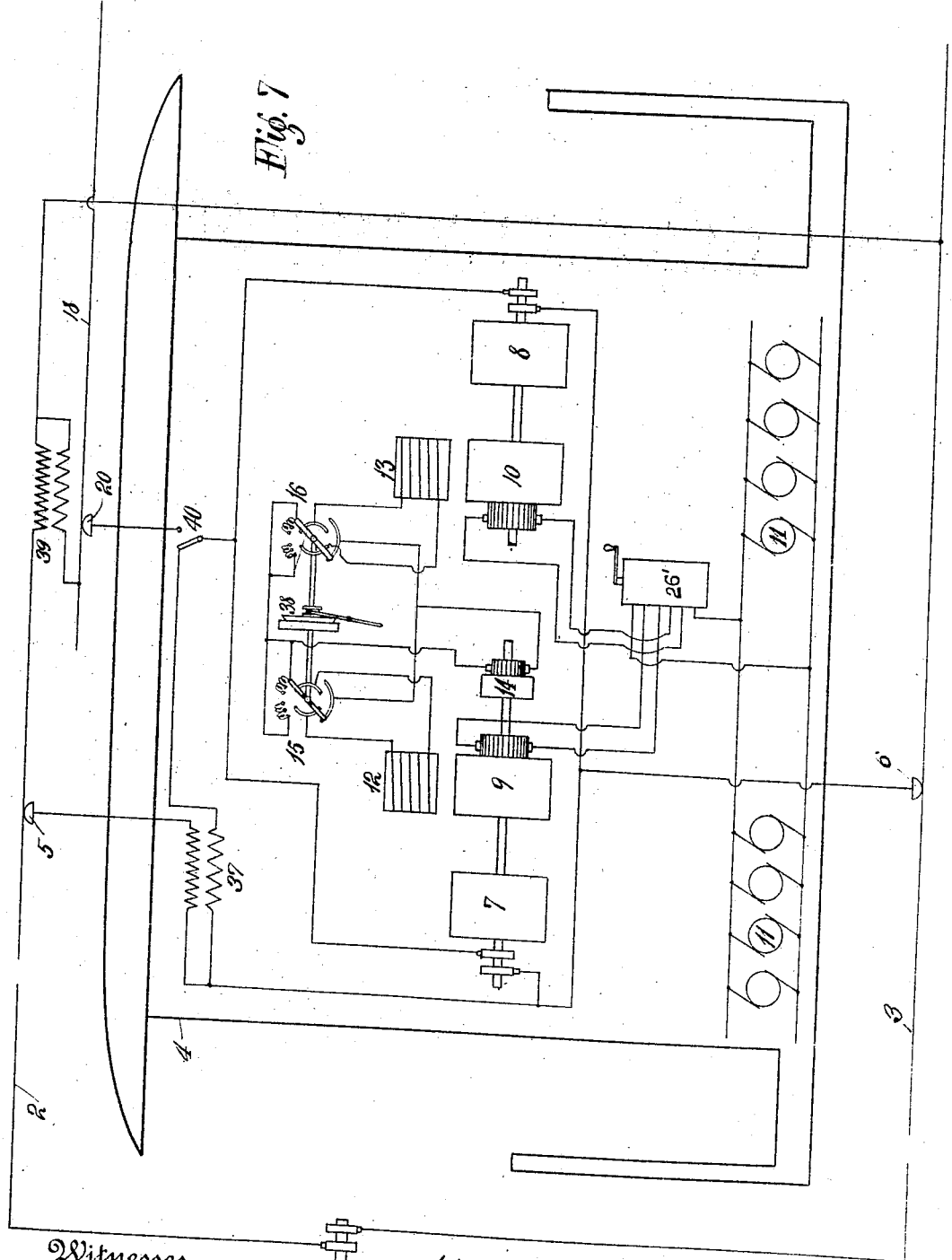
Witnesses
L. K. Sager.
Geo. A. Hoffman.
H. Ward Leonard Inventor.
By his Attorney
C. W. Edwards H. W. LEONARD.
ELECTRIC RAILWAY SYSTEM.
APPLICATION FILED APR. 1, 1905.
1,029,698.
Patented June 18, 1912.
7 SHEETS—SHEET 6.
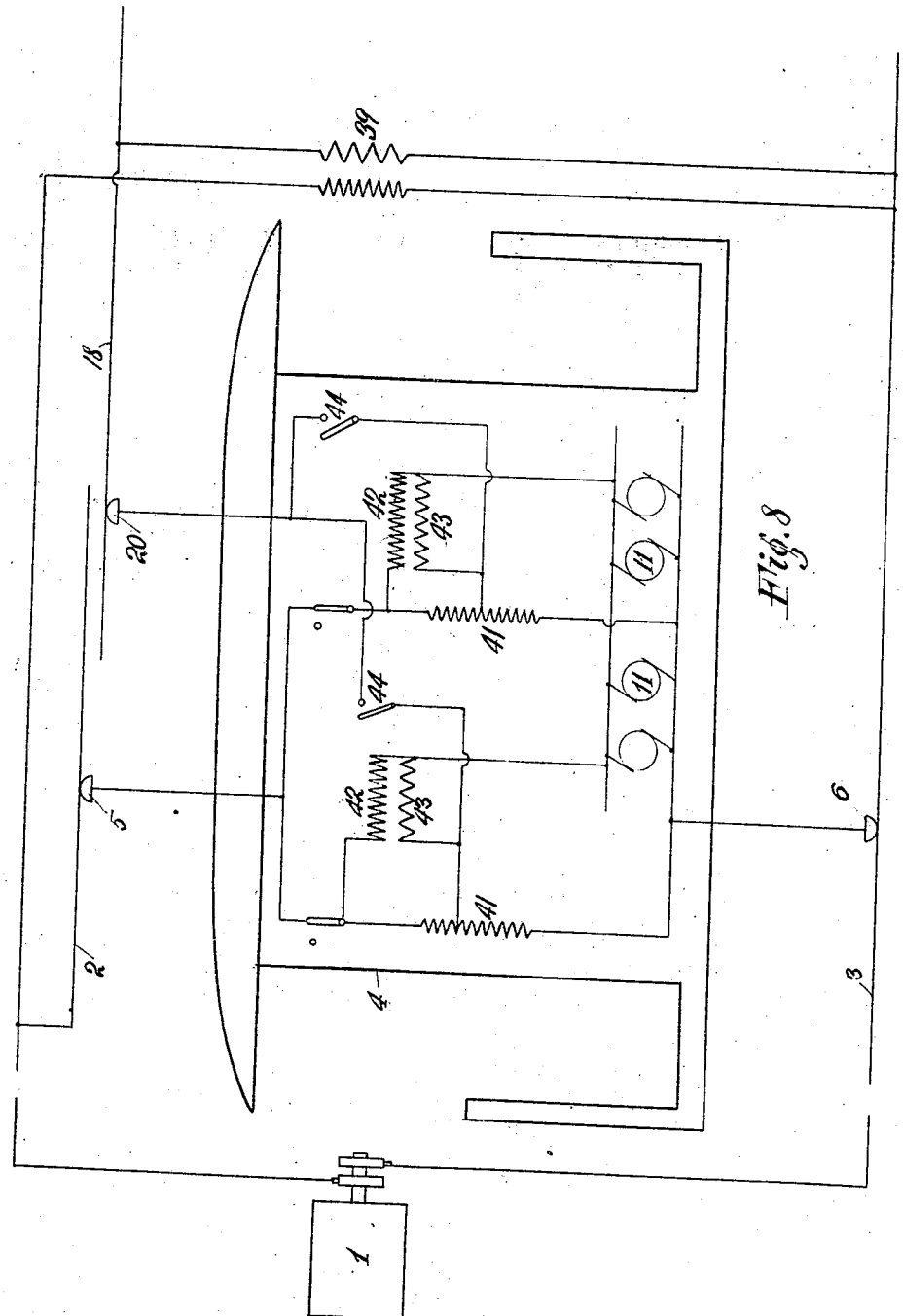

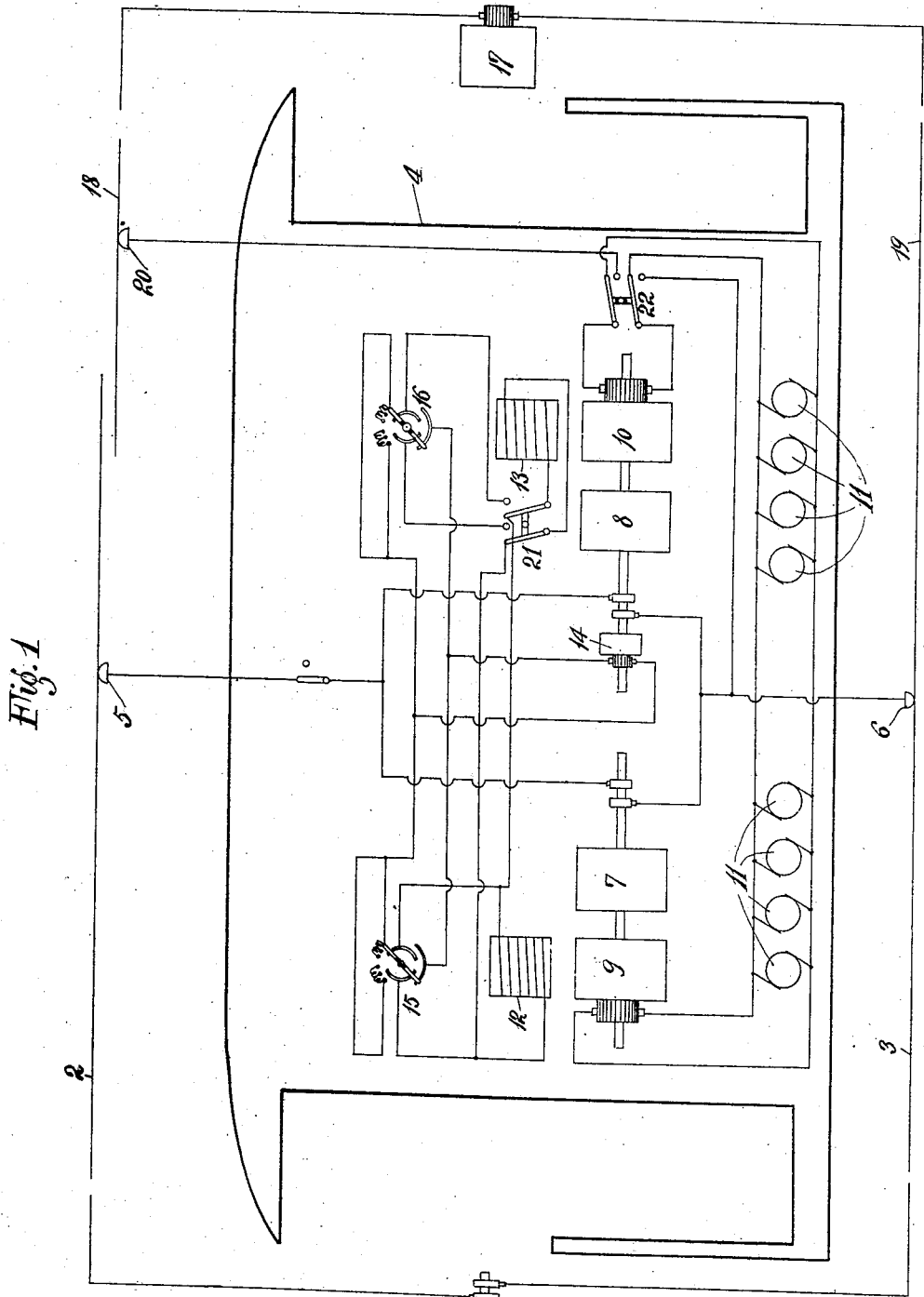

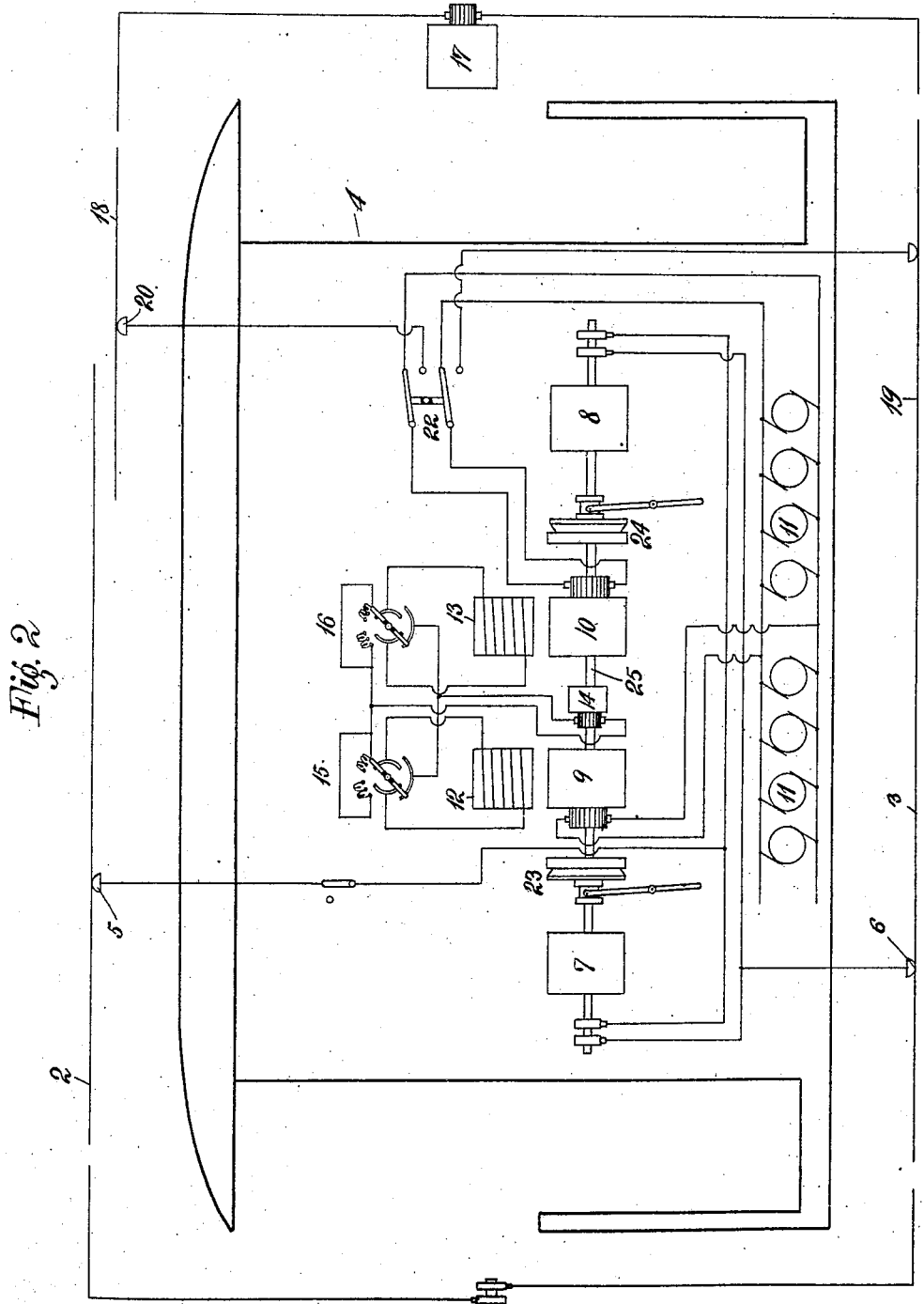

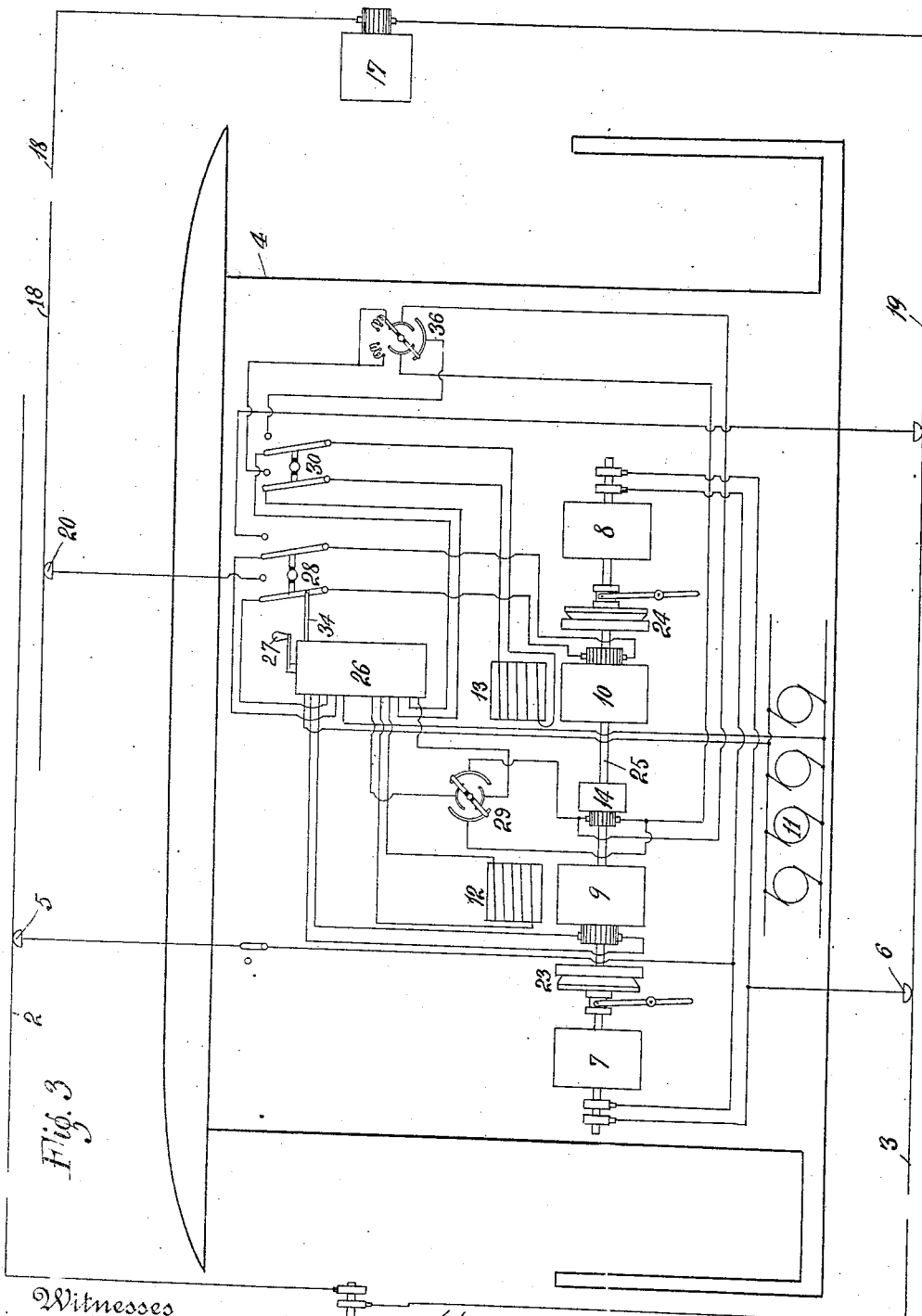

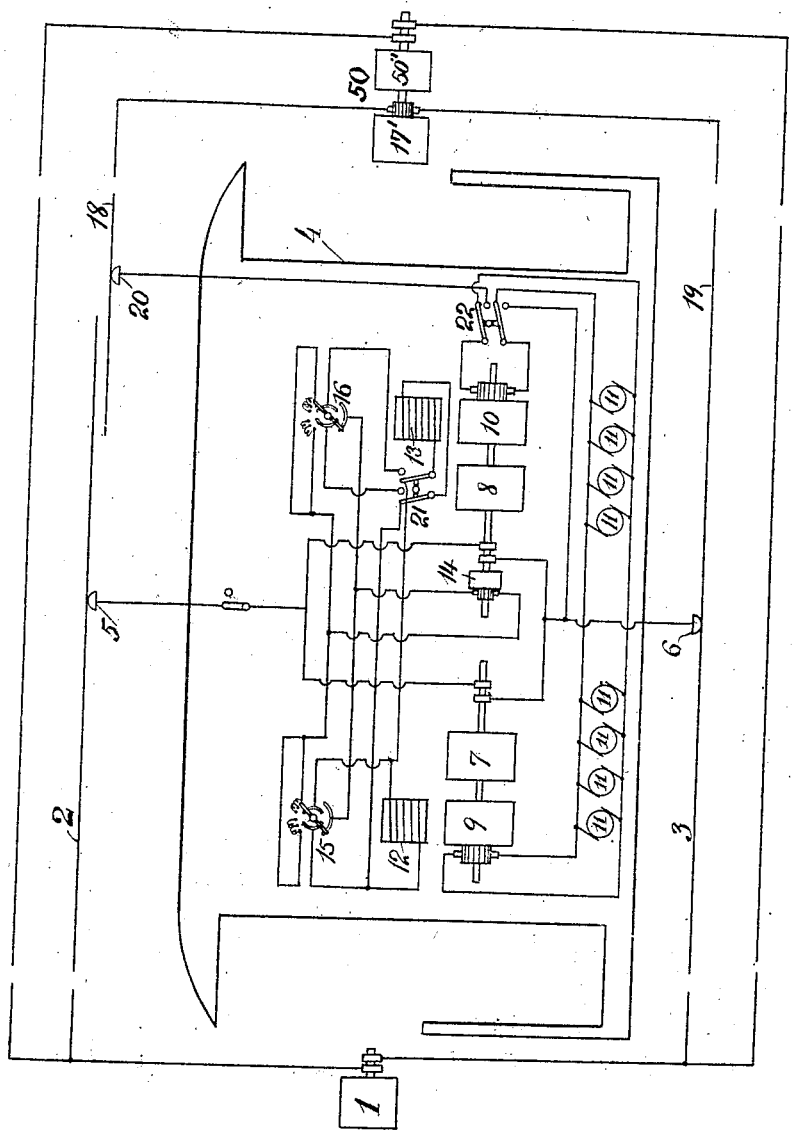

UNITED STATES PATENT OFFICE.

HARRY WARD LEONARD, OF BRONXVILLE, NEW YORK.

ELECTRIC-RAILWAY SYSTEM.

1,029,698.  Specification of Letters Patent.  Patented June 18, 1912.

Application filed April 1, 1905. Serial No. 253,276.

*To all whom it may concern:*

Be it known that I, HARRY WARD LEONARD, a citizen of the United States, residing at Bronxville, in the county of Westchester and State of New York, have invented certain new and useful Improvements in Electric-Railway Systems, of which the following is a full, clear, and exact specification.

My invention relates to the operation of electric railways, especially such as employ under certain operating conditions high tension currents.

The principal object of my invention is to provide means and methods for operating the moving vehicles over long distances by means of the high tension desirable for economy and yet providing means and methods for operating the moving vehicles through cities and towns, tunnels, or other desired sections, by a relatively low and safe tension.

In many instances it will be desirable to use say a single phase supply for the locomotive device, having an electromotive force of 20,000 volts and upward. It is often necessary to move the train into the heart of a city and sometimes through a city or town.

The employment of a bare conductor upon which the moving contact is made, is attended with many objectionable risks when a very high tension is used upon a conductor passing into or through a populous district, and hence it becomes desirable to provide means and methods for reducing such risks to a minimum. This desirable result I accomplish by means of my invention. Usually I have upon the train a plurality of separate transforming devices, each of which normally receives the high tension energy and transforms such energy into lower tension energy for use in the motor circuit. These transforming devices will usually be identical in size and may be on the same locomotive. But in some instances they will be on separate locomotive units and controlled by a multiple unit control. I make use of this plurality of transforming devices in the ways known to the art and also as described in my pending applications to secure improved results as regards acceleration and retardation, control, distribution and reduction of weight, reduction of limiting dimensions, control of amperes and volts in each particular device, interchangeability of parts, increased reliability of service, and restoration of energy, for example.

My invention and various forms thereof will be understood from the following description and accompanying drawings. It will be understood that the figures are diagrammatic and that consequently I have not attempted to show proportions of parts or the preferred relative positions thereof.

Figure 1 is a diagrammatic view of one form of my invention; Figs. 2 and 3 are similar views of modifications; Fig. 4 is a development of the controller indicated in Fig. 3; Figs. 5 and 6 are detail views of the interlocking device; Figs. 7 and 8 are diagrammatic views of other modifications of my invention; and Fig. 9 is a diagrammatic view illustrating a modification of the arrangement of Fig. 1.

Referring to Fig. 1, there is represented at 1, a high voltage single phase generator supplying current to the high voltage supply working conductors 2, 3 which conductors may be arranged in any preferred manner, such as having one conductor overhead and the other a ground return, or both conductors may be overhead, or both may be in a conduit, which conduit may be under the surface of the ground or above the surface, or they may be arranged as in the well known third rail system. A vehicle or locomotive 4 is indicated in dotted lines and carries the moving contacts 5, 6 which engage the conductors 2, 3. The alternating current passes from one supply line to the other through two single phase motors 7, 8 which are shown as connected in parallel. Each of the motors 7, 8 have mounted upon its shaft a generator 9, 10, preferably of direct current and at low potential which supply current to the sets of propelling motors 11, 11. The field strength of the motors may be made variable to vary their speed, and their speed may also be varied in other ways, but in the present instance I have shown means for varying the electromotive force available in the circuit containing the motor armatures. This is accomplished by varying the strength of the fields 12, 13 of the generators 9, 10. A direct current generator 14 is shown mounted on the shaft of the machine 8, which generator 14 supplies current to the fields 12, 13 through the reversing rheostats 15, 16. It will therefore be understood that when operating on the high voltage lines, the motors 7, 8, drive the direct current generators 9, 10 which supply current at a variable electromotive force to the propelling motors. Both fields 12, 13 are then connected in parallel through the rheostat 15 so that they are varied simultaneously by the operation of the single rheostat 15. We will suppose that the supply is a 20,000 volt single phase system, but it will be understood that the supply may likewise be polyphase.

Means may be provided as explained in a pending application and as described below for coupling the generators in series or in parallel for purposes of control and economy in first cost and in operating cost. Now suppose it is necessary to operate the train through a town or city, where on account of municipal requirements for safety it is necessary to limit the tension of the bare supply conductors to say 500 volts. In Fig. 1 there is represented at 17, such a low tension stationary source, in this case a direct current generator supplying current to the conductors 18, 19, which as explained above, may be variously arranged. Instead of having an independent low tension supply, this may be derived from the high tension source by use of suitable transformers at a sub-station. Fig. 9 illustrates such an arrangement, the transformer being indicated at 50 and comprising an alternating current motor 50' driving the direct current generator 17', the motor 50' being supplied with energy from the source 1. I have shown the conductors 3 and 19 joined electrically so that their potential will be the same but they may be independent if desired. I have also shown the conductors 2 and 18 overlapping a short distance so that the train may be operated without the necessity of stopping at the points of change. The car is provided with an additional contact 20 which engages the conductor 18. When the train enters the section of low voltage supply, the switch 21 will be thrown to the right so that the field 13 is placed under the independent control of rheostat 16. This may then be adjusted so that all the work is thrown on to the motor 7 and generator 9 and practically no current will then be delivered by the generator 10. It may then be disconnected from the motor circuit by means of switch 22 and when its electromotive force is adjusted by rheostat 16 to that of the low voltage supply, the switch 22 may be further thrown and so connect the machine 10 to the low tension supply circuit through contacts 20 and 6. Then by manipulation of the rheostats 15 and 16 in a manner well understood all the load may be thrown on to the low tension supply and connection with the high tension supply may be broken. Machine 10 will now be acting as a motor driving the alternating current machine 8 which will act as a generator, and as its speed is approximately the same as before, it will generate a voltage about equal to that formerly received from the high tension supply and deliver this to the machine 7 which will continue to act as a motor and drive the machine 9 as a generator. Thus when operating from the low tension supply, the machines 7 and 9 act as when operated from the high tension supply, the electromotive force delivered by the generator 9 being controlled by varying the rheostat 15. When the armature 10 is connected as above described to the low tension supply circuit, and 7 and 8 are connected with the high tension circuit, the operator can, by manipulating the rheostats, divide the load between the two stationary sources as he may desire, or he can make either source take the entire load, or he can make either source deliver energy into the circuit of the other source, while the motor is at rest or in motion. In operating in this way on the low tension supply, the maximum ampere capacity available is one-half of the former total obtainable with the generator in multiple, but as the grades are generally moderate in towns and cities, this ampere capacity will suffice. The maximum electromotive force available at the motors is also one-half of that which is possible with the two generators in series, but one-half of the full speed will also suffice for duty in passing through towns and cities. Thus it will be seen that by very simple and inexpensive switching devices and without material loss of efficiency in operation, I can secure all the advantages of my voltage control system, both in the open country from a high voltage supply and in cities from a low voltage supply.

Referring to Fig. 2, parts correspondingly numbered represent similar parts referred to in describing Fig. 1. In the present figure however, the direct current machines 9, 10 and 14 are mounted on the same shaft which is shown mechanically coupled as by clutches 23, 24 to the shafts of the alternating current machines 7, 8. These clutches are indicated as closed and the apparatus is indicated as receiving current from the high tension supply. The rheostats 15, 16 are shown as capable of independent operation to vary the electromotive force of the machines 9, 10, but when both machines are acting as generators as when in use on the high tension service, these rheostats will be operated simultaneously to vary the electromotive force delivered by the generators 9, 10 equally and correspondingly. When the low tension section is reached, the load will be thrown off the machine 10 and it will be disconnected from the motor circuit by opening switch 22. Further movement of switch 22 will connect the machine 10 to the low tension source and this machine will then be in a condition to act as a motor to drive its shaft 25 on which is mounted the machines 9, and 14. The clutches 23, 24 may then be opened to disconnect machines 7 and 8 from the shaft 25 and these machines are then thrown out of action. Hence with this form of construction, when on a low tension section, the machine 10 will act as a motor to directly drive the generator 9. The electromotive force delivered by the latter will be varied as before by the rheostat 15 to vary the speed of the motors. When again entering a high tension section the machines 7 and 8 will be started up, as say by closing the clutches 23, 24, and they will again act to drive shaft 25 when receiving current from the high tension line. The machine 10 will then be changed to act as a generator and will be connected to the circuit of the propelling motors as before by moving switch 22. When the locomotive is in a portion of the railway where the high tension contact conductor and the low tension contact conductor overlap, and armature 10 is operatively connected to the low tension circuit while the machines 7 and 8 are operatively connected to the high tension circuit and the clutches 23 and 24 closed, the operator can, by proper manipulation of the rheostats in the well known manner, make the two sources divide the total load as desired; or he can make either source take the entire load; or he can make either source restore energy into the circuit of the other and thereby assist in supplying energy to other devices on that circuit. Such a transfer of energy from the circuit of one source to that of the other can be made independently of whether the locomotive is in motion or at rest. During retardation, while in such an overlapping section, a regenerated braking energy can be restored into either circuit or into both circuits in such proportions of the total as the operator may desire.

In Fig. 3 the same machines are indicated as in Fig. 2. I have shown a controller 26, which by the movement of handle 27 is adapted to connect the armatures 9 and 10 in parallel or in series and also to vary the field strength of these machines in order to vary the speed of the propelling motors. The development of the controller is shown in Fig. 4. Referring to the latter figure, it will be seen that there are two sets of contacts, the upper set for the armature connections and the lower for the field connections. The stationary fingers are indicated on line 1. The terminals of the motor armatures 11 are connected to the first and sixth contacts beginning at the top, the armature 9 is connected to the second and third, and the armature 10 is connected to the fourth and fifth contacts through a double pole switch 28. With regard to the second set of contacts, the first and sixth are connected to the constant electromotive force supply from the machine 14 through a reversing switch 29; the field 12 is connected to the second and third contacts; and the field 13 is connected to the fourth and fifth contacts through a double pole switch 30.

When the fingers or contacts on line 1 engage the conducting strips on line 2, the armatures 9 and 10 are connected in parallel and supply current to the propelling motor armatures 11. The fields 12 and 13 for this position are weak since sections of resistance are connected in series therewith. The electromotive force supplied to the motors is therefore low giving a slow speed. Further movement of the controller handle will gradually cut out the field resistance until at position 3 the full electromotive force of each generator is given to the motors. It is now desired that the two machines be connected in series so as to give a higher electromotive force to further increase the speed of the motors. In passing to position 4, the field 13 of armature 10 is weakened slightly so that all the load is thrown on to the other machine and on further movement of the controller the armature 10 is disconnected at one terminal. The resistance of its field circuit is then increased and the field is finally opened so as to decrease its electromotive force to practically nothing. Movement of the controller will then connect the armatures in series as on line 5. Further movement of the controller will close the field circuit 13 through a high resistance and as this resistance is decreased, the electromotive force delivered by armature 10 will gradually rise, and being additive to the full electromotive force of armature 9 there will be delivered to the propelling motors a gradual increasing electromotive force and consequent increase in speed. When all the resistance is cut out of field 13 the full electromotive force of armature 10 will be generated which added to the full electromotive force of armature 9, will give maximum electromotive force to the motors and consequently maximum speed. This will be attained at position 6.

During the changes described the field strength of the motors 11 will be maintained constant. In some cases I obtain a still further range of speed control by varying the field strength of the motor by well known means. It will be understood that this grouping of the generators in series or in parallel is accomplished while both machines are operating as generators, being driven from the high tension supply lines through the motors 7, 8.

When passing through a low tension section, one of the machines, as machine 10, will be driven as a motor, driving the other machine as a generator. The switches 28 and 30 are change over switches. The switch 28 is shown in Fig. 3 as mechanically interlocked with the controller 26. When operating from the high tension supply, the full movement of controller 26 is permitted as above explained. On the low tension section however, since machine 10 is disconnected from the motor circuit, the movement of controller 26 will be limited to varying the field strength 12 of armature 9 in order to vary the speed of the motors. Also, the changing over from the high tension to low tension should be permitted at a time only when the generators are connected in parallel, or when the armature of machine 10 is disconnected from the circuit. Means for interlocking the parts to accomplish this are shown in Figs. 5 and 6. On the shaft of the controller 26 I mount a plate 31 which has a cutaway portion as shown at 32. Into this cutaway portion extends a projection 33 secured to a rod 34 which is pivotally connected to the switch 28. When the switch 28 is on the contacts for operation from the high tension supply as shown in Fig. 3, the part 33 occupies a position in the inner part of the space 32 and the controller may be turned its full amount, which is assumed in the drawing to be 180°. The space 32 is wide through the first 90° and narrow through the last 90°, it being assumed that during the first 90° of movement the armatures 9 and 10 are in parallel or that armature 10 is disconnected. Hence at such time, the switch 28 may be changed to the low tension supply since pin 33 is free to move in the wide portion of space 32. It is not however, free to move during the last 90° of movement of the controller as the armatures 9, 10 are then connected in series. Hence the controller must be moved back before the switch 28 can be thrown. Also after the switch 28 is thrown, the movement of the controller 26 will be limited, on account of pin 33 engaging the face 35, to movement which will allow the field 12 to be varied in strength since the armature 9 will supply all the current to the propelling motors.

When it is desired to change over to the low tension section, the switches 28, 30 will be thrown to open position preferably when the controller is in such position that the armature 10 is disconnected. The field 13 will then be connected through switch 30 to the reversing rheostat 36 which receives current from the machine 14. By adjusting the rheostat 36 the electromotive force of the armature 10 may be made approximately equal to that of the low tension supply when the switch 28 may then be closed connecting the armature 10 to the low tension supply. The train may then be operated from the low tension supply and the speed varied by moving the controller 26 to vary the electromotive force delivered by armature 9.

In Fig. 7 I have illustrated a system in which the alternating current from the high tension supply is conducted to the train through moving contacts and the high tension is lowered on the train by means of a static transformer 37. This low tension current is then led to the alternating current machines 7, 8 which drive the machines 9, 10. The rheostats 15, 16 may be used to vary the fields 12, 13 and I have shown a clutch 38 coupling them mechanically so that they may be operated in unison or separately. I have also shown a controller 26' for coupling the armatures in series or in parallel as already explained. Preferably the field control and that for coupling the armatures in series or parallel will be united in one controller as explained with reference to Figs. 3 and 4. In passing to the low tension section, which is here indicated as an alternating current supply derived from the main source by means of a static transformer 39, current will be led in at low tension through the moving contact 20. The electromotive force of this supply will approximately equal the electromotive force derived from transformer 37 and current from the low tension supply will be led directly to the machines 7, 8. A switch 40 is shown to connect these machines to one source or the other. In this case when operating from the low tension supply, the transforming machines will all supply their full output and none of them will be used inverted.

In Fig. 8, there is shown a system in which the alternating current is used throughout. The high tension line 2, 3 is shown as supplied by the single phase source 1 and the low tension line 18, 3 is shown as supplied by the same source but at a reduced electromotive force by means of the transformer 39. Two sets of transforming devices are shown on the locomotive and means is shown for varying the voltage applied to the motors for varying the speed. Current from the high tension line is led through the full length of the auto-transformer coils 41, 41, to the return line 3. Two additional coils 42, 43 are provided for regulating the electromotive force applied to the motors. Certain of their elements are movable with reference to each other and their relative induction is thereby varied. By this means the induction due to one coil may be made additive to that of the other giving maximum resultant electromotive force, or the two coils may be placed so as to oppose each other, giving minimum or, in some cases, zero electromotive force to the propelling motors. The coil 42 is connected from one end of the auto-transformer through the motors and the coil 43 is connected from an intermediate point of the auto-transformer to the terminal of the coil 42 which is connected to the motors. Upon passing into a low tension section, the connection to the high tension will be broken and the switches 44 will then be closed making connection to the low tension supply. Under this condition, however, I prefer that current should be led to an intermediate point of the auto-transformer coil and through a portion only of this coil to the return conductor. This is shown in the figures as the same point to which the coil 43 is connected but this is not necessary and may not always be convenient. When connected to the low tension supply, the electromotive force available at the terminals of the auto-transformer coil will equal or approach that previously applied to it and the shifting of the coils 42, 43 with reference to each other will vary the voltage applied to the motors as before. In this case both transforming devices are used to their full capacity when operated from either the high or low tension supply and if desired only one such device may be used.

It will be understood that all the apparatus I have referred to in connection with the different figures need not necessarily be on one vehicle or locomotive of the train but that it may if desired be divided between vehicles. Also there may be as many duplicate devices and locomotives in the train as is necessary and that the various units may be controlled simultaneously by use of a multiple unit control system. Also, although I have indicated a single phase supply or a direct current supply, the current may be polyphase and there may be various transformations in voltage or character of current to secure the results desired.

When it is desired to retard the vehicle, this may be accomplished electrically by restoring energy to the line. Thus the operator by moving the controller or controlling rheostats toward their initial position will cause the propelling motors to act as generators and generate electromotive forces which exceed the electromotive forces of the generator or generators supplying energy thereto; the motors acting as generators driven by the load will then drive the said generator or generators as motors which will cause the energy derived from the propelling motors to be transformed and supplied through the moving contact or contacts to the supply conductors when in either section. I thus secure the advantage of restoring energy to the line in retarding the vehicle.

It will be understood that there may be various modifications and arrangements within the scope of my invention and that I am not limited to forms shown and described, the scope of my invention being indicated by the claims.

Having thus described my invention, I declare that what I claim as new and desire to secure by Letters Patent, is,—

1. The combination of a high tension supply circuit, a low tension supply circuit, an electric vehicle, and means on the vehicle whereby the same can be propelled by connection through moving contacts to either the high tension supply or the low tension supply, said means comprising a winding exterior to the driving motor which delivers electric energy while the vehicle is being propelled by energy received from one of the supply circuits and which receives electric energy while the vehicle is being propelled by energy received from the other supply circuit.

2. The combination of a high tension alternating current supply circuit, a low tension direct current supply circuit, an electric vehicle, and means on the vehicle for transforming independently of the propelling motors energy received from either of said supply circuits.

3. The combination of a high tension supply circuit, a low tension supply circuit supplying unidirectional energy, an electrically propelled vehicle, means for supplying energy from each of said circuits to the propelling motors, and means for varying the voltage of the energy supplied to the motors at the will of the operator independently of variation of resistance in the armature circuit of the motor.

4. The combination of an alternating current supply circuit, a direct current supply circuit, a vehicle, electric motors for propelling said vehicle, means on the vehicle for controlling the voltage of the energy supplied to at least one element of the propelling motors, and means on the vehicle whereby either the alternating current supply or direct current supply may be used for propelling the vehicle.

5. The combination of a high tension alternating current supply circuit, an electrically propelled vehicle, a moving contact for leading energy from the high tension circuit upon the vehicle, means on the vehicle for transforming such high tension energy into lower tension energy at a controllable electromotive force, propelling electric motors having at least one element supplied with such low tension energy at a variable electromotive force for varying the speed of the vehicle, a source of direct current energy, and means whereby the vehicle may be moved by electric energy from said source of direct current energy, said means comprising an additional moving contact.

6. In a railway system, the combination of a section having a high tension alternating current supply circuit, a vehicle having a moving contact for leading such high tension energy upon the vehicle when in said section, means on the vehicle for transforming such high tension energy into lower tension unidirectional energy, an electric motor for propelling the vehicle having at least one element thereof supplied with such low tension energy at a variable electromotive force for obtaining a variable speed, a source of low tension direct current energy, a separate moving contact for leading such low tension energy upon the vehicle, and means for varying the electromotive force generated in the circuit of said element of the motor.

7. In a railway system, the combination of a section having a high tension alternating current supply circuit, a vehicle having a moving contact for leading such high tension energy upon the vehicle when in said section, means on the vehicle for producing in a local closed circuit electric energy at a lower tension, an electric propelling motor having at least one element thereof connected in said closed circuit, means for varying the electromotive force of said lower tension energy for varying the speed of said motor, a source of direct current energy, and means whereby the energy from the latter source may be utilized for moving the train in another section and whereby the speed of the train in said latter section may be varied by varying the electromotive force produced in a circuit containing the said motor element.

8. The combination of two devices, each of which may receive and deliver energy, an electric motor, means for supplying said motor with energy from said devices, and means whereby one of said devices may be operated to supply energy to the other of said devices and cause the latter to supply energy to the said motor.

9. The combination of two devices, an electric motor, means for supplying energy to said motor from both of said devices, and means whereby one of said devices can be operated so as to supply energy to the other device and cause the latter to supply energy to the said motor.

10. The combination of a source of electromotive force, two volt-producing windings, an electric motor, means for connecting said windings to cause them to supply energy jointly to a winding of said motor, a second source of electromotive force, and means for causing one of said two windings to receive energy from said latter source and supply energy to operate the other of said two windings which in turn delivers energy to the said motor winding.

11. The combination of an electric supply circuit, a second electric supply circuit, the character of the energy in the two circuits as regards current characteristics being different, an electric motor, an electric energy transformer, and means for supplying said transformer with energy from either of said supply circuits and for supplying the transformed energy to at least one element of the motors.

12. The combination of a vehicle, an electric motor for propelling the vehicle, an alternating current supply, a direct current supply, and means whereby the motor may be operated at different speeds from either of said sources of supply, said means comprising means for varying in either case, a magnetically induced electromotive force in series with at least one element of said motor.

13. The combination of a motor adapted to be operated by magnetically induced current of a certain character, a source of current which supplies current of said character under certain conditions of operation, a second source of magnetically induced current of different character, and means between said second source and the motor for changing the current from said second source into current of the character required by the motor and for varying the voltage of the latter current for varying the speed of the motor.

14. The combination of a source of relatively low tension unidirectional electric energy, a motor operated by energy from said source under certain operating conditions, a second source of relatively high tension energy, and means for supplying the motor with energy derived from said high tension source under certain other operating conditions and for varying the speed of the motor in the latter case by developing different electromotive forces in series with the motor.

15. The combination of a motor the armature of which is supplied under all operative conditions with low tension continuous current energy, a supply circuit of continuous current energy, a supply circuit of energy which produces current which is not continuous, and means for supplying said armature with energy from said two supply circuits under different operative conditions respectively and for varying the speed of the motor by developing different voltages in series with the motor armature.

16. The combination of a motor, two sources of energy located at a distance from each other, one of said sources being dependent upon the other and producing unidirectional energy, and means for supplying said motor with energy from one source under certain conditions of operation and from the other source under other conditions of operation and for varying the speed of the motor under certain conditions from rest to full speed independently of rheostatic resistances in series with the motor armature.

17. The combination of a motor having at least one element adapted to be operated by current of a certain character, two sources of magnetically induced electromotive force, the character of the energy of said sources being different, and means for supplying the said motor elements with current of the required character from said two sources, and for developing different electromotive forces in series with said motor element to vary the speed of the motor.

18. The combination of an electrically propelled vehicle, the propelling motor thereon having at least one element supplied with current of a certain character under all normal operative conditions, a source of electromotive force outside of the vehicle, a section supplied from said source, means for operating said motor from said source when in said section, a second section supplied with energy, means on the vehicle for transforming the energy and for supplying the motor with the transformed energy when the vehicle is in said second section, the current supplied by one of said sections being unidirectional, and means whereby the voltage of said transformed energy may be varied at the will of the operator for controlling the motor.

19. The combination of an electrically propelled vehicle, an exterior high tension source of energy, means on the vehicle for transforming said high tension energy to energy of any desired voltage and for supplying the transformed energy to at least one element of the propelling motor, a relatively low tension source of unidirectional energy exterior to the vehicle, and means for supplying said motor element with energy from said low tension source of energy.

20. The combination of an electrically propelled vehicle, a source of electromotive force, means for leading a relatively high tension current derived from said source upon the vehicle through moving contacts, means on the vehicle for transforming such high tension energy to energy of lower tension at different electrical pressures and supplying the latter to at least one element of the propelling motor under certain operating conditions, a low tension unidirectional supply, and means for leading energy from said low tension supply upon the vehicle through moving contacts and supplying the same to said motor element under other operating conditions.

21. The combination of an electrically propelled vehicle, a source of electromotive force, means for leading a relatively high tension current derived from said source upon the vehicle through moving contacts, means on the vehicle for transforming such high tension energy to energy of lower tension at different pressures as desired and supplying the latter to at least one element of the propelling motor under certain operating conditions, a low tension unidirectional supply, and means for leading energy from said low tension supply upon the vehicle through moving contacts and supplying the same to said motor element under other operating conditions, the character of the current in the said motor element being the same under both of said operating conditions.

22. The combination of two stationary sources of electromotive force, the electromotive forces of which are different from each other, an electric motor, means for operating the motor from either of said sources, said means comprising means for varying the speed of the motor by varying the net electromotive force developed in its armature circuit when receiving energy from either of said sources.

23. The combination of two sources of electromotive force of different tension, an electrically propelled vehicle, means for operating the vehicle from either of said sources, said means comprising means on the vehicle for producing a variable controllable electromotive force for varying the speed of the propelling motor when receiving energy from either of said sources.

24. The combination of an electric vehicle, a stationary source of electromotive force, means on the vehicle for transforming energy from said source into variable voltage energy, and means whereby the vehicle may be operated from a source of higher electromotive force than that of said first named source.

25. The combination of a vehicle, a stationary source of low tension uni-directional energy, means on the vehicle for receiving energy from said source and whereby such energy may be transformed into alternating current energy of higher electromotive force.

26. The combination of a plurality of sources of electromotive force having different characteristics both as regards voltage and as regards current, an electric motor, means for operating the motor from each of said sources, said means comprising an electromotive force producing device functionally related to the motor, and means for varying the electromotive force of said device for varying the speed of the motor when receiving energy from either of said sources.

27. The combination of an electric motor, two electromotive force producing windings functionally related to said motor, means for varying the electromotive forces of said windings for varying the speed of said motor, a plurality of sources of electromotive force, the electromotive forces of said sources being materially different, and means whereby the motor may be operated from each of said sources.

28. In a railway system, a plurality of sources of electromotive force, the electromotive forces of said sources being radically different, an electrically propelled vehicle, a propelling motor, two electromotive force producing windings functionally related to said motor, means for varying the electromotive forces of said windings for controlling the speed of said motor, and means whereby energy may be supplied from each of said sources to said motor.

29. In a railway system, a section supplied with high tension energy, a section supplied with lower tension energy, a vehicle, a motor for propelling the vehicle, means on the vehicle for supplying energy to said motor when in either the high or low tension section and comprising two electromotive force producing windings, and means for varying the effective electromotive forces of said windings to control the motor.

30. The combination of an electric vehicle, a source of electric energy, means for delivering upon the vehicle energy from said source in two divisions and for varying the electromotive force of each of said divisions, means for supplying a propelling motor winding with energy due to the joint action of said divisions, a source of energy the electromotive force of which is materially different from that of the first named source, and means whereby the vehicle may be operated from said second source.

31. The combination of a high tension supply circuit, a low tension supply circuit, an electric vehicle, and means on the vehicle whereby the same can be propelled by connection through moving contacts to either the high tension supply or the low tension supply, said means comprising means for transforming the energy and controlling the voltage of the energy supplied for propulsion while the vehicle is being operated from either of the two supply circuits.

32. In a railway system, the combination of a section having a high tension alternating current supply circuit, a vehicle having a moving contact for leading said high tension energy upon the vehicle when in said section, means on the vehicle for transforming such high tension energy into lower tension unidirectional energy, an electric motor for propelling the vehicle having at least one element thereof supplied with such lower tension energy at a variable electromotive force for obtaining a variable speed, and means for controlling the movement of the vehicle from a source of unidirectional energy.

33. In a railway system, the combination of a section having a high tension alternating current supply circuit, a vehicle having a moving contact for leading such high tension energy upon the vehicle when in said section, means on the vehicle for producing in a local closed circuit electric energy at a lower tension, an electric propelling motor having at least one element thereof connected in said closed circuit, means for varying the electromotive force of said lower tension energy for varying the speed of said motor, and means for moving the train in another section by energy having different characteristics from that of said high tension alternating current supply circuit.

34. The combination of an electric vehicle, two sources of electric energy having different electrical characteristics and each adapted to supply energy for the propulsion of the vehicle, two electromotive force producing windings on the vehicle, propelling electric motors, means for connecting said windings in different ways for controlling the energy delivered by them to said motors so as to secure different speeds and torques, and means for causing one of said windings to receive energy and the other to deliver energy.

35. The combination of a plurality of generator windings, a plurality of motor windings, means for supplying said motor windings with energy from said generator windings, and means whereby one of said generator windings is caused to act as a motor winding and drive another of said generator windings for supplying energy from the latter winding to certain of said motor windings.

36. The combination of a source of direct current, a source of alternating current, a winding adapted to be revolved by current from said first named source, a winding adapted to be revolved by current from said second named source, and means whereby each of said windings may be caused to drive the other and for connecting and disconnecting said windings from said sources respectively.

37. The combination of two direct current machines having revolving elements, two alternating current machines having revolving elements, and means whereby the direct current revolving elements of said first named machines may be driven by the alternating current revolving elements of said second named machines and whereby the direct current revolving element of one of said first named machines may be driven by the direct current revolving element of the other of the said first named machines.

38. The combination of two supply circuits the electromotive forces upon which are different, two dynamo electric machines having mechanically related armatures, and means comprising an electromagnetic winding whereby each of said armatures may be operated as a motor armature by energy from its respective supply circuit and thereby cause the other of said armatures to act as a generator armature.

39. The combination of a high tension supply circuit, a low tension supply circuit, a dynamo electric machine having a revolving winding adapted to receive energy from said high tension circuit, a dynamo electric machine having a revolving winding adapted to receive energy from said low tension circuit, and means for causing either of said windings to receive energy from its respective supply circuit and mechanically drive the other winding.

40. The combination of two stationary sources of electric energy having different characteristics, an electric vehicle, and means whereby said vehicle may be electrically accelerated and electrically retarded while operated from either of said sources.

41. The combination of a high tension supply circuit, a low tension supply circuit, a dynamo electric machine having an armature adapted to be operated by energy from said high tension circuit, a dynamo electric machine having an armature adapted to be operated from said low tension circuit, a generator, means whereby the armature of said generator may be driven by one or the other of said first named armatures, and a motor having a winding supplied with energy from the armature of said generator.

42. The combination of an electrically propelled vehicle, a high tension winding and a low tension winding coöperating therewith, a second high tension winding and a second low tension winding coöperating therewith, a high tension source, a low tension source, and means comprising moving contacts whereby said high tension windings may be connected with said high tension source or whereby one of said low tension windings may be connected with said low tension source for supplying energy to the other of said low tension windings.

43. The combination of a high tension source, a low tension source of different current characteristics from those of said high tension source, a generator having means for varying the voltage of its armature, a variable speed motor connected in circuit with said armature, and means for driving said generator armature from either of said two sources.

44. The combination of an electric vehicle, means for leading upon the vehicle high tension energy from a stationary source, means for converting said high tension energy into two divisions of the energy, said means comprising two low tension electromotive force producing windings, means for supplying electric energy from said two windings to the propelling motors, and means for supplying to the vehicle low tension energy from a low tension source.

45. The method of electrically braking a moving vehicle from a high speed to a low speed which consists in generating electric energy by the movement of the vehicle while its speed is being reduced and passing low tension energy from the vehicle through a moving contact into a low tension supply circuit under certain conditions, and generating low tension energy by the movement of the vehicle, transforming to high tension energy, and passing high tension energy from the vehicle through a moving contact into a high tension supply circuit under conditions.

46. The method of operating an electric vehicle which consists in propelling the vehicle by the joint action of energy from two different stationary sources of different electromotive forces, and electrically braking the vehicle by restoring energy into the supply circuit of at least one of said sources.

47. The method of operating an electric vehicle which consists in propelling the vehicle by energy from a high tension source, propelling the vehicle by energy from a low tension source, and electrically braking the vehicle by restoring energy to either of said sources respectively while the speed of the vehicle is being reduced from a high speed to a low speed.

48. The method of operating an electric vehicle which consists in supplying high tension energy to the vehicle, dividing said energy into two divisions of electric energy on the vehicle, employing said divisions jointly for supplying their combined energy to the propelling motor, and supplying low tension energy to the vehicle for propelling the vehicle.

49. The method of operating an electric railway vehicle which consists in supplying high tension energy to the vehicle for propelling the same in one section, supplying low tension energy to the vehicle for propelling it in another section, supplying both high tension and low tension energy to the vehicle simultaneously for propelling the same under certain conditions, and supplying energy to the armatures of the propelling motors at different voltages for securing different speeds.

50. The method of operating an electric motor which consists in supplying high tension energy for supplying energy to the motor, supplying low tension energy for supplying energy to the motor, transferring the motor load from one source of supply to the other, and supplying to the circuit containing the motor armature energy at different voltages for securing different speeds.

51. The method of operating a railway locomotive which consists in leading high tension energy upon the locomotive through a moving contact for propelling the locomotive, leading low tension energy upon the locomotive through a moving contact for propelling the locomotive, transferring the load from one source of energy to the other without interrupting the supply of energy to the locomotive, and supplying to the circuit containing the armature of a propelling motor energy at different voltages for securing different speeds.

52. The method of transferring a locomotive load from a source of high tension to a source of low tension or vice versa which consists in causing the energy from the source in use to develop an electromotive force on the locomotive which approximately corresponds to that of the source to which the load is to be transferred, then causing both sources to simultaneously supply the propelling energy, then shifting the load to the other source, and then disconnecting the first source.

53. The combination of two sources of electromotive force, the electromotive forces of which are different, an electric motor adapted to be operated by energy from either of said sources, and electromagnetic energy transforming means adapted to receive energy from either of said sources and deliver the same at different voltages to the armature of said motor.

54. A source of direct current energy, a source of alternating current energy, an electric motor, and means for employing energy from the two sources simultaneously and jointly for operating said motor and for supplying said joint energy at widely different voltages for the purposes of speed control.

55. In a railway system, a high tension section supplying high voltage energy, a low tension section supplying low voltage energy, and means on a train for transforming the high tension energy to a suitable voltage for the propelling motor and for transforming the low tension energy up and down again to a suitable voltage for said motor.

56. In a system of motor control, a source of alternating current energy, a source of direct current energy, an electric motor supplied with energy from either of said sources, and a single controller for controlling the energy supplied to the motor when supplied with energy from either of said sources.

57. The combination of sources of electromotive force, the electromotive forces of which are radically different, an electric motor, and means for concurrently controlling the energy from said sources of different electromotive forces for controlling the speed of the motor.

58. The combination of sources of electromotive force, the electromotive forces of which are radically different, an electric motor, and means for delivering a plurality of different voltages to the motor when energy is supplied from either of said sources and for effecting the control of the motor when energy is received from both sources simultaneously.

59. The method of operating a motor which consists in supplying a motor winding with energy from two generative windings, changing the circuit connections of said windings relative to each other to vary the electrical characteristics of the energy supplied to said motor winding, and at other times causing one of said two windings to act as a motor winding and drive the other as a generative winding, and supplying the resultant energy to the motor winding.

60. The combination of a high tension source, a low tension source, an electrical vehicle, means for causing said sources to divide the total load and drive said vehicle with energy from both of said sources, and means for causing the generation of electric energy by the movement of the vehicle.

61. The combination of two sources of electric energy, the characteristics of the energy supplied being different, an electric motor and means for supplying energy from either or both of said sources to a winding of said motor, and for causing the motor to generate electric energy.

62. The combination of a source of high tension alternating current energy, a remote source of low tension direct current energy, an electric motor, and means for supplying energy from both of said sources to a winding of said motor so as to divide the load on said sources and for causing the motor to generate electric energy under certain conditions.

63. The combination of two stationary sources of electric energy, a vehicle, a propelling electric motor, means on the vehicle, for simultaneously receiving energy from said two sources and for simultaneously delivering energy to the same winding of said motor, and means for causing the motor armature to generate electric energy for braking purposes under certain conditions.

64. The combination of two sources of electric energy, a plurality of electric motors acting on a common load, converting means for transferring the load from one of said sources to the other without interrupting the current supplied to said motors, and means for causing the motors to generate electric energy under certain conditions.

65. The method of controlling an electric motor which consists in generating alternating current energy, supplying to the motor armature energy derived from said alternating current energy, varying the electromotive force in series with the motor armature, supplying the motor armature with energy from a source of direct current, and varying the electromotive force in series with the motor armature.

66. The method of controlling a translating device, which consists in developing high tension electric energy, transforming said energy by magnetic induction to energy of lower tension and supplying said latter energy to said translating device, developing electric energy by magnetic induction at a different source, simultaneously supplying energy from said different source to said translating device, and developing different electromotive forces in series with said translating device for applying different electromotive forces thereto.

67. The method of electrically braking a motor driven vehicle which consists in causing the moving load to generate electric energy by causing the propelling motor to act as a generator, transforming said energy under certain operating conditions into high tension single phase energy and leading such energy through a moving contact to a supply circuit, and under certain other operating conditions transforming said energy into low tension continuous current energy and leading such energy through a moving contact to a supply circuit.

68. The method of electrically braking a motor driven vehicle which consists in causing the moving load to generate electric energy by causing the propelling motor to act as a generator, controlling the electromotive force of said generator by varying an electromotive force in series with it, transforming said energy under certain operating conditions into high tension single phase energy and leading such energy through a moving contact to a supply circuit, and braking the motor under other operating conditions by causing it to generate energy.

69. The method of controlling the propelling motor of a vehicle which consists in supplying current to the vehicle from a stationary source under certain operating conditions, supplying in parallel with said current the current from a generator on the vehicle, regulating the joint current to the motor by varying an electromotive force in series with the motor and between the motor and each of said generators, and supplying the motor with energy from a different stationary source under other operating conditions.

70. The method of operating a railway vehicle which consists in supplying energy to the motor armature from a stationary source under certain conditions, simultaneously supplying energy to the motor armature from a supply winding on the vehicle, and supplying to the motor armature under other conditions energy from a second stationary source having different characteristics from the first source.

71. The combination of a source of high tension energy, means comprising an electromotive force producing winding for deriving low tension energy from said source, an electric motor, at least a part of said winding and at least one element of said motor being connected in a local loop, means for varying the electromotive force supplied by said winding for varying the speed of the motor, and a source of low tension energy adapted to supply energy to the motor under certain operating conditions.

72. The combination of a source of high tension energy, a source of low tension energy, a vehicle, moving contacts for leading energy from either of said sources upon the vehicle, an electric motor having a field winding energized independently of its armature current under certain conditions for propelling the vehicle, and a single controlling means for controlling the motor when the vehicle is being operated from either of said sources.

73. The method of controlling an electric motor which consists in supplying the motor with energy from either one or the other of two different sources of electromotive force, at least one of said sources being unidirectional, developing an electromotive force in series with the motor armature, and varying said electromotive force for controlling the motor.

74. The method of controlling an electric motor which consists in supplying the motor with energy from either one or the other of two different sources of different electromotive force, developing an electromotive force in series with the motor armature, and varying and reversing said electromotive force for controlling the motor.

75. The method of controlling electric energy which consists in generating high and low tension energy at two different sources respectively, transforming said high tension energy, supplying said transformed energy to a translating device, varying the electromotive force applied to said device by varying an electromotive force in series therewith, supplying said device with energy from said other source and varying the electromotive force applied to said device by varying an electromotive force in series with said device.

76. The method of electrically retarding a moving load which consists in causing the load to generate electric energy, transforming said energy to high tension energy, supplying said high tension energy to a supply circuit, and at another time supplying energy at comparatively low tension directly to a supply circuit.

77. The method of retarding a dynamo electric machine which consists in generating by said machine low tension energy, supplying such energy to a low tension circuit under certain conditions, transforming said energy under other conditions to high tension energy, and supplying said latter energy to a high tension circuit.

78. The method of operating a railway vehicle which consists in generating at two different sources high tension and low tension energy respectively, leading energy from one of said sources to the vehicle, leading energy from the other of said sources to the vehicle, regulating the energy received upon the vehicle by a source of electromotive force, and supplying the regulated energy to a propelling motor.

79. The method of operating a motor which consists in simultaneously supplying to the motor energy from a high tension source and from a low tension source, and varying an electromotive force developed in series with the motor for controlling the energy jointly supplied thereto.

80. The method of controlling an electric motor which consists in supplying energy to the motor armature from two electromotive force producing windings connected in parallel, supplying energy to the motor armature from said two windings connected in series, and causing one of said windings to absorb energy and thereby generate energy in the other winding and supplying said latter energy to the motor.

81. The method of operating a railway vehicle which consists in leading high tension energy upon the vehicle, deriving therefrom in a local loop containing the armature of a propelling motor a variable electromotive force, leading upon the vehicle low tension energy, and supplying said low tension energy to said local loop whereby the operation of the vehicle is dependent upon the joint effect of said high tension and low tension energy.

82. The method of operating a railway vehicle which consists in supplying low tension unidirectional energy to the vehicle from a stationary source, supplying high tension energy to the vehicle from a stationary source, transforming said high tension energy to low tension energy, supplying energy derived from said sources to the propelling motor, and controlling the motor in either case by varying an auxiliary electromotive force in series with the motor armature.

83. The method of electrically braking a moving load which consists in driving the armature of a dynamo electric machine by the load, supplying current so generated to two electromotive force producing windings, transforming the energy into alternating current energy, and supplying said latter energy to a circuit.

84. The combination of a dynamo electric machine, two supply circuits having different electrical characteristics and means for causing said machine to receive energy from and deliver energy to each of said supply circuits.

85. The combination of a high tension supply circuit, a low tension supply circuit of unidirectional energy, a dynamo electric machine, and controlling means for supplying energy from each of said circuits to said machine when said machine acts as a motor and for supplying energy to each of said supply circuits when the machine acts as a generator.

86. In a railway system, the combination of a high tension section, a low tension section of unidirectional energy, a vehicle, an electric motor for propelling said vehicle, means for supplying energy from each of said sections to the motor and for causing the motor to act as a generator for retarding the vehicle.

87. The combination of a source of high tension electric energy, means comprising two electromotive force producing windings for deriving low tension energy from said source, an electric motor, said two windings and the armature of the motor being connected in a local loop, and means for varying the electromotive force of at least one of said windings for varying the speed of said motor.

88. The combination of a high tension source of electric energy, means comprising an electromotive force producing winding for deriving low tension energy from said source, an electric motor, an auxiliary electromotive force producing winding connected in series with said first named winding and with a winding of said motor, and a separate source of electromotive force adapted to be connected in series with said auxiliary winding and said motor winding.

89. The combination of a high tension source of electric energy, means comprising a plurality of electromotive force producing windings for deriving low tension energy from said source, an electric motor, a winding of said motor being connected in series with said first named windings and supplied with energy therefrom, and a separate source of electromotive force adapted to supply energy to said motor winding.

90. In a railway system, the combination of a source of high tension energy, a source of low tension energy, a vehicle, a propelling motor for said vehicle, means on the vehicle for converting the high tension energy into low tension energy, means for supplying low tension energy to the motor, and means for varying the electromotive force of the energy supplied to the motor when the motor is supplied with energy supplied from said high tension source or with energy supplied from said low tension source.

91. The combination of an electric motor, a high tension source of energy for said motor, a low tension source of energy for said motor, an electromotive force producing winding in series with the motor winding, and means for varying the electromotive force produced by said electromotive force producing winding when the motor receives energy from either of said sources.

92. The combination of a source of high tension energy, a source of unidirectional low tension energy, a vehicle, moving contacts for leading energy from either of said sources upon the vehicle, an electric motor for propelling the vehicle, and a single controlling means for controlling the motor when the vehicle is being operated from either and from both of said sources.

93. The combination of a source of high tension energy, a source of unidirectional low tension energy, a vehicle, moving contacts for leading energy from either of said sources upon the vehicle, an electric motor for propelling the vehicle, and an electromotive force producing winding for controlling the motor when the vehicle is being operated from either of said sources.

94. In a railway system, the combination of a vehicle, high tension working conductors, low tension working conductors adapted to supply unidirectional current high tension and low tension contact devices for leading current from said conductors upon the vehicle, an electric motor supplied with energy from said conductors for propelling the vehicle, and means for electrically braking by feeding back current into each of said working conductors.

95. The combination of two stationary sources of electric energy the characteristics of the energy supplied being different, an electrically propelled vehicle, and means on said vehicle for delivering energy derived from either of said sources to the other of said sources.

96. A source of high tension energy, a source of low tension energy, an electric motor, a winding supplying energy to said motor, two windings adapted to receive energy and thereby cause said first named winding to supply energy to said motor, means for supplying energy from said high tension source to one of said two windings, and means for supplying energy from said low tension source to the other of said two windings.

97. The combination of an alternating current source, a continuous current source, an electric motor, a winding, and means for causing energy from said two sources to act jointly in generating energy in said winding, for supplying energy from said winding to a winding of said motor.

98. The combination of a source of high tension electric energy, a source of low tension electric energy, a motor receiving energy from said high tension source, a motor receiving energy from said low tension source, a generator driven jointly by said two motors, and a third electric motor receiving energy from said generator.

99. The combination of a source of low tension direct current energy of constant electromotive force, a source of high tension alternating current energy of constant electromotive force, a vehicle, an electric motor for propelling the vehicle, and means for converting energy from said two sources into direct current energy of variable voltage for varying the speed of said motor.

100. The combination of an electric motor, two electromotive force producing windings, and means for causing said windings to generate energy while connected in series and in parallel and for causing one of said windings to generate energy and the other to absorb electric energy.

101. The method of operating a railway vehicle which consists in supplying high tension and low tension energy from two different sources respectively to the vehicle, at least one of said sources producing unidirectional energy, and controlling said energy upon the vehicle in each case separately so as to render available energy having the same characteristics, and supplying said latter energy to a propelling motor.

102. The combination of a source of high tension energy, means comprising an electromotive force producing winding for deriving low tension energy from said source, an electric motor, at least a part of said winding and at least one element of said motor being connected in series, means for varying the electromotive force in series with the said element for varying the speed of the motor, and a source of low tension adapted to supply energy to said element under certain operating conditions.

103. The combination of a source of high tension energy, a source of low tension unidirectional energy, a vehicle, moving contacts for leading energy from either of said sources upon said vehicle, an electric motor for propelling said vehicle, said motor having a field winding energized independently of its armature current under certain conditions, and means for controlling said motor when said vehicle is being operated from either of said sources.

104. The method of controlling electric energy which consists in developing high tension and low tension energy, transforming said high tension energy, supplying said transformed energy to a translating device, changing the electromotive force applied to said translating device by changing the electromotive force in series therewith, supplying said device with the low tension energy and changing the electromotive force applied to said device by changing an electromotive force in series with said device.

105. The method of operating a railway vehicle which consists in leading high tension energy upon the vehicle, deriving therefrom different electromotive forces in a circuit containing the armature of a propelling motor, leading upon the vehicle low tension energy and supplying said low tension energy at different electromotive forces to said armature.

106. The combination of a source of high tension energy, a source of low tension unidirectional energy, a vehicle, moving contacts for leading energy from each of said sources upon the vehicle, an electric motor for propelling the vehicle, and controlling means on the vehicle for controlling the motor when the vehicle is being operated from either of said sources, said means comprising a device adapted to produce different electromotive forces in series with the motor armature.

107. The combination of a high tension supply circuit, a low tension supply circuit supplying unidirectional energy, a source of electric energy for said high tension circuit, a source of electric energy for said low tension circuit, said sources being independent of each other, an electrically propelled vehicle, means for supplying energy from each of said circuits to the propelling motors, and means for varying the voltage of the energy supplied to the motor at the will of the operator independently of variation of resistance in the armature circuit of the motor.

In testimony whereof I affix my signature, in presence of two witnesses.

H. WARD LEONARD.

Witnesses:
CAROLYN G. LEONARD,
J. WHARTON STOKES.

---

Copies of this patent may be obtained for five cents each, by addressing the "Commissioner of Patents, Washington, D. C."

---

Correction in Letters Patent No. 1,029,698.

It is hereby certified that in Letters Patent No. 1,029,698, granted June 18, 1912, upon the application of Harry Ward Leonard, of Bronxville, New York, for an improvement in "Electric-Railway Systems," an error appears in the printed specification requiring correction as follows: Page 9, line 81, after the word "under" insert the word *other;* and that the said Letters Patent should be read with this correction therein that the same may conform to the record of the case in the Patent Office.

Signed and sealed this 23rd day of July, A. D., 1912.

[SEAL.]

C. C. BILLINGS,
*Acting Commissioner of Patents.*